(12) United States Patent
Yano et al.

(10) Patent No.: US 8,089,531 B2
(45) Date of Patent: Jan. 3, 2012

(54) IMAGE PROCESSOR, IMAGE ACQUISITION APPARATUS, STORAGE MEDIUM OF IMAGE PROCESSING PROGRAM AND IMAGE PROCESSING METHOD

(75) Inventors: Takahiro Yano, Akishima (JP);
Masatoshi Okutomi, Tokyo (JP);
Masao Shimizu, Tokyo (JP)

(73) Assignees: Olympus Corporation, Tokyo (JP);
Tokyo Institute of Technology, Tokyo (JP)

( * ) Notice: Subject to any disclaimer, the term of this patent is extended or adjusted under 35 U.S.C. 154(b) by 594 days.

(21) Appl. No.: 12/323,647

(22) Filed: Nov. 26, 2008

(65) Prior Publication Data
US 2009/0174793 A1 Jul. 9, 2009

(30) Foreign Application Priority Data
Nov. 28, 2007 (JP) ................... 2007-307902

(51) Int. Cl.
*H04N 5/262* (2006.01)
*H04N 5/228* (2006.01)
*G06K 9/40* (2006.01)

(52) U.S. Cl. ............... 348/239; 348/208.99; 348/208.4; 382/254

(58) Field of Classification Search .. 348/208.4–208.11, 348/222.1, 239, 241; 382/254–275
See application file for complete search history.

(56) References Cited

U.S. PATENT DOCUMENTS

| 5,032,916 | A | | 7/1991 | Matsuura et al. | |
| 7,057,645 | B1 | * | 6/2006 | Hara et al. | 348/208.6 |
| 7,548,659 | B2 | * | 6/2009 | Ofek et al. | 382/254 |
| 7,778,439 | B2 | * | 8/2010 | Kondo et al. | 382/100 |
| 7,899,273 | B2 | * | 3/2011 | Saito | 382/300 |
| 2006/0017817 | A1 | * | 1/2006 | Okubo | 348/208.99 |

FOREIGN PATENT DOCUMENTS

| JP | 2-290398 A | 11/1990 |
| JP | 7-135597 A | 5/1995 |
| JP | 2000-156799 A | 6/2000 |
| JP | 2002-29032 A | 1/2002 |
| JP | 2006-329897 A | 12/2006 |

OTHER PUBLICATIONS

Japanese Office Action dated Nov. 1, 2011 (and English translation thereof) in counterpart Japanese Application No. 2007-307902.

* cited by examiner

*Primary Examiner* — Jason Chan
*Assistant Examiner* — Pritham Prabhakher
(74) *Attorney, Agent, or Firm* — Holtz, Holtz, Goodman & Chick, PC

(57) ABSTRACT

An image processor includes an inter-superimposed-image deformation acquisition unit configured to acquire deformation information between superimposed images included in a multiple image in which images of a subject are superimposed, an image deformation unit configured to generate at least two deformed images by performing deformation processing with respect to the multiple image at least twice to be geometrically deformed based on the acquired deformation information between superimposed images, and a signal intensity relationship acquisition unit configured to acquire signal intensity relationship information indicative of a relationship between signal intensities of the superimposed images included in the multiple image. The image processor further includes a signal processing unit configured to perform addition processing of the at least two deformed images generated from the deformation processing by using the acquired signal intensity relationship information.

16 Claims, 5 Drawing Sheets

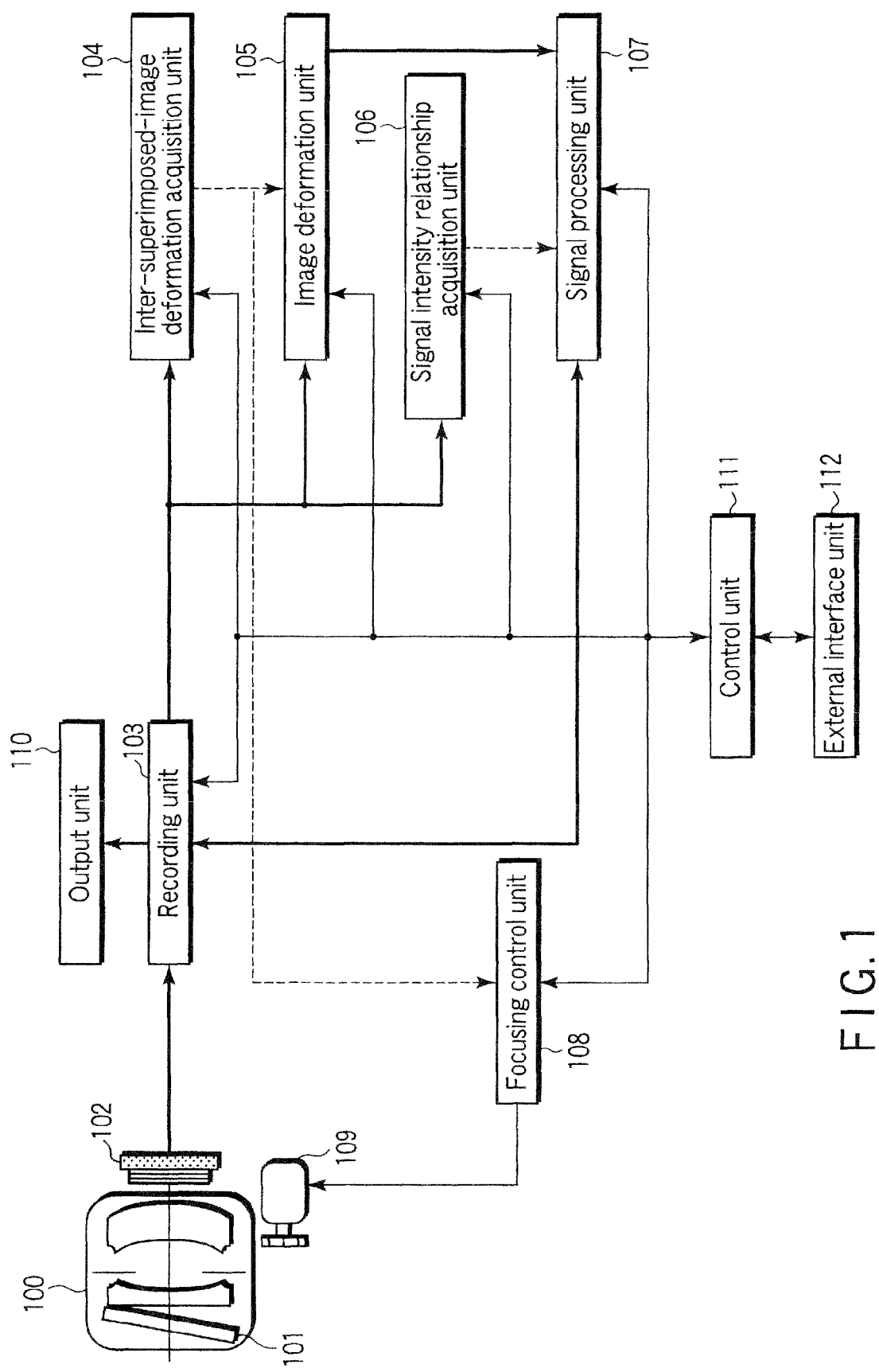
F I G. 1

IMAGE PROCESSOR, IMAGE ACQUISITION APPARATUS, STORAGE MEDIUM OF IMAGE PROCESSING PROGRAM AND IMAGE PROCESSING METHOD

CROSS-REFERENCE TO RELATED APPLICATIONS

This application is based upon and claims the benefit of priority from prior Japanese Patent Application No. 2007-307902, filed Nov. 28, 2007, the entire contents of which are incorporated herein by reference.

BACKGROUND OF THE INVENTION

1. Field of the Invention

The present invention relates to an image processor and an image processing method that restore a superimposed image state of a multiple image in which acquired images of a subject are superimposed on each other, an image acquisition apparatus including the image processor, and a storage medium storing an image processing program allowing a computer to function as such an image processor.

It should be noted that a "multiple image" in this specification represents general images in which images of a subject are superimposed on each other. Specifically, it represents: an image acquired when an image acquisition apparatus forms images of a subject in a superimposed manner; a ghost image in which images of a subject are superimposed because of an electronic or an optical function; a flare image; an image in which images of a subject are multiply-layered because of a failure in positioning processing when a plurality of images are positioned and superimposed on each other; and others. Further, "multiple" means a state where images are at least partially superimposed on each other.

2. Description of the Related Art

There is proposed a technology that includes a mechanism that acquires images of a subject in a superimposed manner in an image acquiring apparatus such as a camera, acquires images of the subject in the form of a multiple image, and measures a displacement between superimposed images in the multiple image to measure a distance to the subject when acquiring the image by the image acquisition apparatus. For example, Jpn. Pat. Appln. KOKAI Publication No. 2006-329897 discloses a technique that uses double image reflected on a transparent plate to measure a distance. Jpn. Pat. Appln. KOKAI Publication No. 7-135597 discloses a technique that acquires a double image by utilizing a diaphragm having a plurality of apertures to acquire a double image to measure a distance.

In a conventional example, when removing ghosting in a ghost image wherein images in a television program appear in a superimposed manner because of the influence of reflection of electromagnetic waves by buildings and other structures, a ghost canceling technique using, e.g., a ghost canceling reference signal (GCR signal) has been adopted as disclosed in Jpn. Pat. Appln. KOKAI Publication No. 2000-156799.

When acquiring an image by using an image acquisition apparatus such as a camera, there is known multiple image generation due to a flare phenomenon that backlight or strong light provokes reflection/scattering on or in a lens surface. To avoid such a phenomenon, an ingenuity, e.g., attaching a lens hood to a periphery of a camera lens is executed.

In the conventional example, when a plurality of images are positioned and the plurality of images are superimposed on each other, a multiple image may be produced from the superimposed images because of a failure in positioning. In such a case, processing of blurring a part between the superimposed images to correct the image is carried out.

BRIEF SUMMARY OF THE INVENTION

According to a first aspect of the present invention, there is provided an image processor comprising:

an image input unit configured to input a multiple image in which images of a subject are superimposed on each other;

an inter-superimposed-image deformation acquisition unit configured to acquire deformation information between superimposed images included in the multiple image input through the image input unit;

an image deformation unit configured to generate at least two deformed images by performing deformation processing with respect to the multiple image input through the image input unit at least twice to be geometrically deformed based on the deformation information between superimposed images acquired by the inter-superimposed-image deformation acquisition unit;

a signal intensity relationship acquisition unit configured to acquire signal intensity relationship information indicative of a relationship between signal intensities of the superimposed images included in the multiple image input through the image input unit; and a signal processing unit configured to perform addition processing of the at least two deformed images generated by the deformation processing by using the signal intensity relationship information acquired by the signal intensity relationship acquisition unit.

According to a second aspect of the present invention, there is provided an image acquisition apparatus comprising:

an image acquisition optical system configured to form an image of luminous flux of a subject;

a multiple image formation unit configured to form images of the subject in a superimposed manner in the image acquisition optical system;

an image signal generation unit configured to convert light from the image acquisition optical system into an electrical signal and generate an image signal from the converted electrical signal;

an inter-superimposed-image deformation acquisition unit configured to acquire deformation information between superimposed images included in the multiple image having at least two images generated by the image acquisition optical system, the multiple image formation unit, and the image signal generation unit in a superimposed manner;

an image deformation unit configured to generate at least two deformed images by performing deformation processing with respect to the multiple image at least twice to be geometrically deformed based on the deformation information between superimposed images acquired by the inter-superimposed-image deformation acquisition unit;

a signal intensity relationship acquisition unit configured to acquire signal intensity relationship information indicative of a relationship between signal intensities of the superimposed signals included in the multiple image; and a signal processing unit configured to perform addition processing of the at least two deformed images generated by the deformation processing by using the signal intensity relationship information acquired by the signal intensity relationship acquisition unit.

According to a third aspect of the present invention, there is provided a storage medium storing an image processing program allowing a computer to execute the following steps:

performing input processing of a multiple image in which images of a subject are superimposed on each other;

acquiring deformation information between superimposed images included in the input multiple image;

generating at least two deformed images by performing deformation processing with respect to the input multiple image at least twice to be geometrically deformed based on the acquired deformation information between superimposed images;

acquiring signal intensity relationship information indicative of a relationship between signal intensities of the superimposed images included in the input multiple image; and performing addition processing of the at least two deformed images generated from the deformation processing by using the acquired signal intensity relationship information.

According to a fourth aspect of the present invention, there is provided an image processing method comprising:

performing input processing of a multiple image in which images of a subject are superimposed on each other;

acquiring deformation information between superimposed images included in the input multiple image;

generating at least two deformed images by performing deformation processing with respect to the input multiple image at least twice to be geometrically deformed based on the acquired deformation information between superimposed images;

acquiring signal intensity relationship information indicative of a relationship between signal intensities of the superimposed images included in the input multiple image; and generating a restored image in which images of the subject are not superimposed on each other by adding the at least two deformed images generated from the deformation processing based on the acquired signal intensity relationship information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a structure of an image acquisition apparatus according to a first embodiment of the present invention;

DETAILED DESCRIPTION OF THE INVENTION

Figure 2:
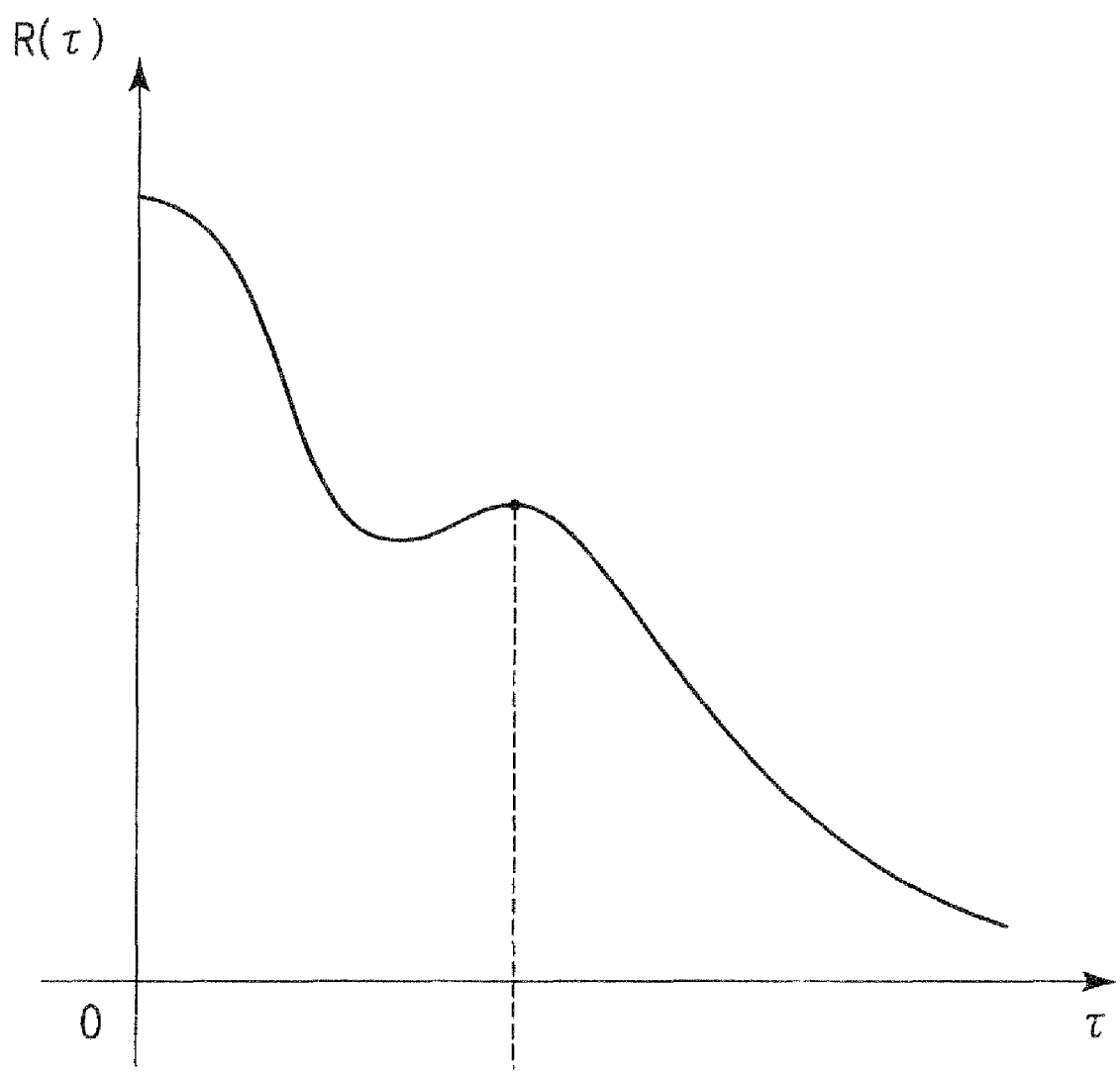
FIG. 2 is a view showing an example of an auto-correlation function.

The best mode for carrying out the present invention will now be explained with reference to the drawings.

First Embodiment

As shown in FIG. 1, an image acquisition apparatus according to a first embodiment of the present invention includes: an image acquisition optical system 100 including a multiple image formation unit 101; an image acquisition unit 102; a recording unit 103; an inter-superimposed-image deformation acquisition unit 104; an image deformation unit 105; a signal intensity relationship acquisition unit 106; a signal processing unit 107; a focusing control unit 108; an AF motor 109; an output unit 110; a control unit 111; and an external interface unit 112. It should be noted that an arrow of a solid thick line represents a flow of a picture signal, an arrow of a solid thin line represents a flow of a control signal; and an arrow of a broken line represents a flow of any other signal.

The image acquisition optical system 100 forms an image of luminous flux of a subject, and the multiple image formation unit 101 forms a multiple image of the subject in the image acquisition optical system 100. As an actual structure of the multiple image formation unit 101 at this time, a structure that acquires a double image reflected on a transparent plate as explained in, Jpn. Pat. Appln. KOKAI Publication No. 2006-329897 may be adopted. The image acquisition unit 102 converts light from the image acquisition optical system 100 into an electrical signal and generates an image signal from the converted electrical signal. The image acquisition optical system 100, the multiple image formation unit 101, and the image acquisition unit 102 generate a multiple image having at least two images in a superimposed manner. The recording unit 103 records this generated multiple image.

The inter-superimposed-image deformation acquisition unit 104 acquires deformation information between superimposed images included in the multiple image recorded in the recording unit 103. The image deformation unit 105 executes deformation processing at least twice with respect to the multiple image recorded in the recording unit 103 to be geometrically deformed based on the deformation information between superimposed images acquired by the inter-superimposed-image deformation acquisition unit 104. As a result, the image deformation unit 105 generates at least two deformed images. In this specification, the "deformed image" means an image obtained by performing the deformation processing with respect to the original image to be geometrically deformed. It should be noted that deformation having no displacement amount, i.e., deformation of carrying out an unit matrix may be also included in one deformation processing operation. In this case, an image subjected to the unit matrix deformation processing is also included in the "deformed image".

The signal intensity relationship acquisition unit 106 acquires signal intensity relationship information indicative of a relationship between signal intensities of the superimposed images included in the multiple image recorded in the recording unit 103. The signal processing unit 107 executes addition processing of the at least two deformed images generated from the deformation processing by using the signal intensity relationship information acquired by the signal intensity relationship acquisition unit 106 to obtain a restored image.

The focusing control unit 108 obtains a subject distance based on the deformation information between superimposed images acquired by the inter-superimposed-image deformation acquisition unit 104. The AF motor 109 controls the AF motor 109 in such a manner that the image acquisition optical system 100 can focus on the subject.

The output unit 110 outputs the restored image obtained by the signal processing unit 107 and recorded in the recording unit 103.

The control unit 111 controls the recording unit 103, the inter-superimposed-image deformation acquisition unit 104, the image deformation unit 105, the signal intensity relationship acquisition unit 106, the signal processing unit 107, and the focusing control unit 108 in response to an instruction from the external interface unit 112. The external interface unit 112 is a user interface, e.g., an input member such as a release switch, various buttons and switches, and a display member such as an LED.

Operations of the respective units in such a structure will be explained hereinafter.

The multiple image formation unit 101 included in the image acquisition optical system 100 optically forms images of the subject in a multiple manner. The images of the subject formed in the multiple manner by this multiple image formation unit 101 are acquired by the image acquisition unit 102 and converted into an electrical signal, thereby generating an image signal of a multiple image.

The multiple image acquired by this image acquisition unit 102 is recorded in the recording unit 103.

Thereafter, restoration processing for the multiple image recorded in the recording unit 103 is executed.

Here, to aid understanding the present invention, the principle of the restoration processing of the multiple image will be first explained.

An image generation model of the multiple image acquired by the image acquisition optical system 100 (multiple image formation unit 101) and the image acquisition unit 102 is as represented by the following Expression (1):

$$y = \frac{1}{1+\alpha}(I + \alpha A(L))z \qquad (1)$$

Here, y is the multiple image, z is the image before being superimposed (image to be restored to its original state), $\alpha$ is the relative intensity of superimposed images included in the multiple image (signal intensity relationship information), and $0 \leq \alpha < 1$ is achieved. I is a unit matrix. A(L) is a system matrix that deforms the image by a deformation amount L. A double image is formed based on Expression (1).

The system matrix that generates a double image based on Expression (1) is as follows:

$$\frac{1}{1+\alpha}(I + \alpha A(L)) \qquad (2)$$

Its inverse matrix can be represented as follows:

$$(1+\alpha)\left[\sum_{n=0}^{K}(-\alpha)^n\{A(L)\}^n\right] \qquad (3)$$

Here, K represents the number of times of deformation for the image. However, since image deformation is performed for n=0 to K, the actual number of times of deformation is K+1. When restoration is carried out, a number which is at least one or above must be specified with respect to K.

A restoration expression required to perform multiple image restoration based on Expression (3) is as represented by the following Expression (4):

$$z = (1+\alpha)\left[\sum_{n=0}^{K}(-\alpha)^n\{A(L)\}^n\right]y \qquad (4)$$

To execute image restoration based on this Expression (4), it can be understood that a plurality of types of deformation processing using deformation $\{A(L)\}^n$ can be executed with respect to the multiple image, a deformation amount can be subjected to calculation $(-\alpha)^n$, and then addition processing can be carried out. Further, when multiplication by $(1+\alpha)$ is performed after the addition processing, brightness of the image can be normalized.

The above has described the principle of the restoration processing of the double image.

The principle of the restoration processing in case of a more general N-fold image will be explained.

An image generation model of an N-fold image acquired by the image acquisition optical system 100 (multiple image formation unit 101) and the image acquisition unit 102 is as represented by the following Expression (5):

$$y = \beta\left\{\sum_{i=0}^{N-1}\alpha^i A^i(L)\right\}z \qquad (5)$$

Here, N is a number that represents the number of image layers, N=2 represents a double image, and N=3 represents a triple image. y is a multiple image, z is an image before being superimposed (image to be restored to its original state), $\alpha$ is a relative intensity of superimposed images included in the multiple image, and $0 \leq \alpha < 1$ is achieved. I is a unit matrix. A(L) is a system matrix that deforms an image by a deformation amount L. An N-fold image is generated based on Expression (5). $\beta$ is a parameter that normalizes brightness of the image, and an arbitrary value can be taken. As a specific set value for $\beta$, the following value or the like is set:

$$\beta = \frac{1}{\sum_{i=0}^{N-1}\alpha^i} \qquad (6)$$

A system matrix that generates the N-fold image based on Expression (5) is as follows:

$$\beta\left\{\sum_{i=0}^{N-1}\alpha^i A^i(L)\right\} \qquad (7)$$

An inverse matrix thereof can be represented as follows:

$$\frac{1}{\beta}\sum_{n=0}^{K}\left\{-\sum_{i=1}^{N-1}\alpha^i A^i(L)\right\}^n \qquad (8)$$

Here, K represents the number of times of deformation for the image. However, since image deformation is performed for n=0 to K, the actual number of times of deformation is K+1. When restoration is carried out, a number which is at least one or above must be specified with respect to K.

A restoration expression required to perform multiple image restoration based on Expression (8) is as represented by the following Expression (9):

$$z = \frac{1}{\beta}\sum_{n=0}^{K}\left\{-\sum_{i=1}^{N-1}\alpha^{i}A^{i}(L)\right\}^{n} y \quad (9)$$

Based on the above expression, restoration processing of the N-fold image can be carried out. It should be noted that a relationship of the relative intensity of the superimposed images is changed in accordance with a power law, an arbitrary relationship may be actually provided as the relationship of the relative intensity of the superimposed images.

The above has explained the principles of the restoration processing for the double image and the N-fold image.

An example where a processing target is restricted to a double image will be explained hereinafter. However, when a multiple image includes three or more superimposed images, the same processing can be carried out by expanding the following explanation.

Image restoration processing according to the structure depicted in FIG. 1 will be explained.

A multiple image recorded in the recording unit 103 is transmitted to the inter-superimposed-image deformation acquisition unit 104, and the inter-superimposed-image deformation acquisition unit 104 acquires a displacement amount between superimposed images (deformation information between superimposed images). In this acquisition, when header information of the multiple image has a description of deformation information between superimposed images or signal intensity relationship information indicative of a relationship between signal intensities of the superimposed images, this information is utilized. On the other hand, when a deformation amount between the superimposed images is unknown, the inter-superimposed-image deformation acquisition unit 104 estimates a displacement amount between the superimposed images. A displacement amount between the superimposed images is estimated based on, e.g., calculation of an auto-correlation function value of the multiple image. The following Expression (10) represents an example of a calculating formula for an auto-correlation function:

$$y_2(i) = y_1(i + \tau) \quad (10)$$

$$R(\tau) = \frac{\sum_{i \in \Omega}(y_1(i) - \overline{y}_1)(y_2(i) - \overline{y}_2)}{\sqrt{\sum_{i \in \Omega}(y_1(i) - \overline{y}_1)^2 \sum_{i \in \Omega}(y_2(i) - \overline{y}_2)^2}}$$

Here, each of $y_1$ and $y_2$ is each image of the superimposed images displaced by an amount $\tau$, i is an image coordinate, $\Omega$ is a calculation range, each of $\overline{y}1$ and $\overline{y}2$ is an average value in the calculation range for $y_1$ or $y_2$.

The auto-correlation function is as shown in, e.g., FIG. 2. The inter-superimposed-image deformation acquisition unit 104 calculates a displacement amount of superimposed images (deformation information between superimposed images) by detecting a second peak representing a correlation value between the superimposed images after calculating such an auto-correlation value.

It should be noted that the auto-correlation function is calculated in a one-dimensional space here. For example, when a direction of displacement between the superimposed images in the multiple image is already known, the displacement between the superimposed images can be searched based on one-dimensional search along the direction of the displacement between the superimposed images. In regard to such information, a direction of displacement between superimposed images can be obtained in advance by an optical calibration technique if such a structure that a double image reflected on a transparent plate is acquired as disclosed in Jpn. Pat. Appln. KOKAI Publication No. 2006-329897 is adopted, and hence this structure is utilized. When a direction of displacement between superimposed images in a multiple image is unknown, searching an auto-correlation function value in two-dimensional space and detecting a second peak can suffice.

The deformation information between the superimposed images acquired by the inter-superimposed-image deformation acquisition unit 104 is transmitted to the image deformation unit 105 and the focusing control unit 108.

The deformation information transmitted to the focusing control unit 108 is converted into a subject distance based on a correspondence relationship between the deformation information and the subject distance held in the focusing control unit 108. For example, a relationship between the deformation information and the subject distance is obtained as this correspondence relationship based on calibration in advance, and the obtained relationship is written in a lookup table in the focusing control unit 108. The focusing control unit 108 controls the AF motor 109 based on an obtained subject distance amount in such a manner that the image acquisition optical system 100 can focus on the subject.

On the other hand, the image deformation unit 105 uses the multiple image recorded in the recording unit 103 and the deformation information between superimposed images acquired by the inter-superimposed-image deformation acquisition unit 104 to execute deformation processing with respect to the multiple image.

As this deformation processing, a plurality of types of deformation $\{A(L)\}^n$ (where n=0, 1, ..., K) are executed as represented by Expression (4). Here, L is the deformation information obtained by the inter-superimposed-image deformation acquisition unit 104.

Here, deformation when n=0 is as represented by the following Expression (11), and this is deformation having no displacement amount.

$$\{A(L)\}^0 = I \quad (11)$$

For example, if deformation information L is L=(2, 3) [pixel] with a deformation amount indicating translational displacement, $\{A(L)\}^n$ (where n=0, 1, ..., K) is translational displacement deformation of (0, 0) (deformation is not actually effected) when n=0, it is translational displacement deformation of (2, 3) when n=1, it is translational displacement deformation of (4, 6) when n=2, and it is translational displacement deformation of (2K, 3K) when n=K.

Although translational displacement is taken as an example of simple deformation processing, but actual deformation processing is not restricted to translational displacement deformation. For example, deformation processing with a higher degree of freedom than translational displacement processing+scaling processing, affine deformation processing, or projective deformation processing is executed. In such a case, the same scheme can be used to perform the deformation processing.

The plurality of deformed images generated by image deformation processing in the image deformation unit 105 are then transmitted to the signal processing unit 107 where actual restoration processing is performed. Further, signal intensity relationship information of the superimposed images acquired by the signal intensity relationship acquisition unit 106 is also transmitted to this signal processing unit 107.

It should be noted that the signal intensity relationship information acquired by the signal intensity relationship acquisition unit 106 is a value that is determined based on, e.g., a lens or a reflectivity of a half mirror included in the image acquisition optical system 100, and hence obtaining this information based on optical calibration in the image acquisition optical system 100 is preferable. However, the intensity relationship may be measured every time image acquisition is performed, or a user may specify the intensity relationship through the external interface unit 112.

The signal processing unit 107 uses the transmitted signal intensity relationship information acquired by the signal intensity relationship acquisition unit 106 and the plurality of deformed images generated by the image deformation unit 105 to execute image restoration processing based on the following Expression (12):

$$z = (1+\alpha) \sum_{n=0}^{K} (-\alpha)^n [\{A(L)\}^n y] \quad (12)$$

Here, signal intensity information α represents a signal intensity relationship as $0 \leq \alpha < 1$. When signal intensities of the superimposed images are equal to each other, $\alpha=1$ is achieved, but $0<\alpha<1$ is preferable in actual system design. Furthermore, ($\{A(L)\}^n y$) represents the plurality of deformed images deformed by the plurality of types of deformation processing. Respective pieces of ($\{A(L)\}^n y$) are added while considering $(-\alpha)^n$, and $(1+\alpha)$ is multiplied after addition, thereby generating a restored image z.

Figure 3:
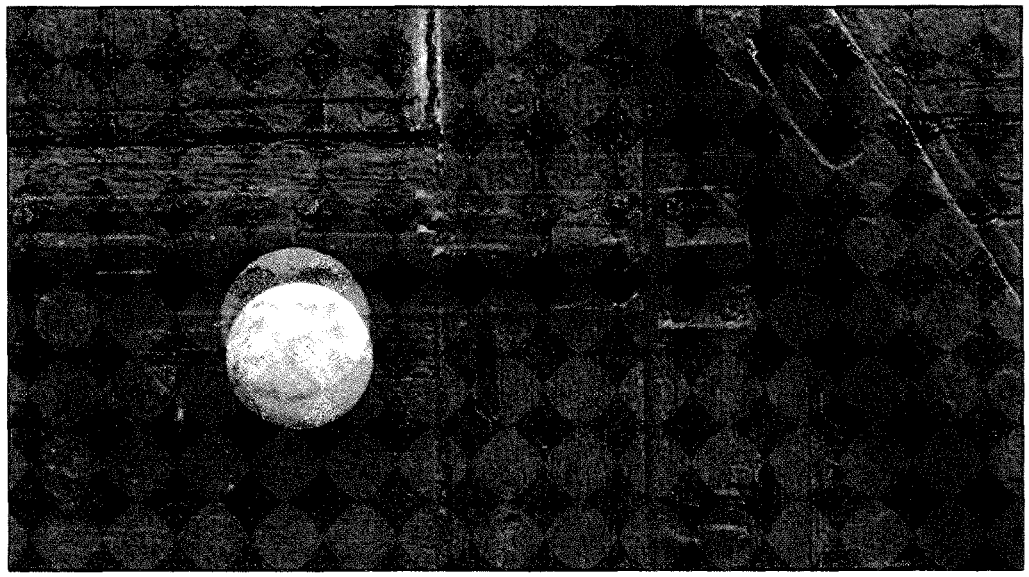
FIG. 3 is a view showing an example of a double image.
Figure 4:
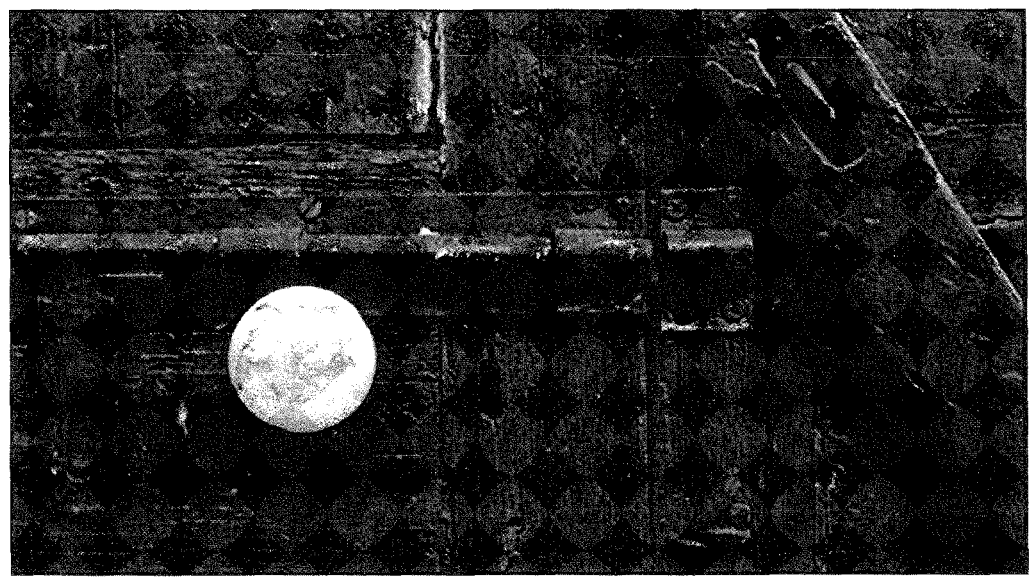
FIG. 4 is a view showing an image in a restored state produced from the double image depicted in FIG. 3.

The restored image of the multiple image is generated in this manner. For example, such a restored image as shown in FIG. 4 is generated from such a double image as depicted in FIG. 3. The thus generated restored image is transferred to/recorded in the recording unit 103, and then it can be utilized as a resource for appreciation through the output unit 110.

The above has described the example where the displacement of the superimposed images is the single displacement. However, in reality, a multiple image may be divided into partial images for respective parts, and the above-explained technique may be used with respect to the partial images. When a multiple image is divided into a plurality of partial images to be subjected to restoration processing, the restoration processing can be excellently executed even though superimposed images have complicated motions. In this case, it is required to carry out processing that finally integrates restoration results obtained from execution of the restoration processing with respect to the partial images. The signal processing unit 107 may include this integration processing.

A method of executing such restoration processing with a multiple image being divided into partial images will be explained with reference to a flowchart of FIG. 5.

That is, the inter-superimposed-image deformation acquisition unit 104 first reads the multiple image recorded in the recording unit 103 (step S1). At this time, if header information of the multiple image includes a description of deformation information or signal intensity relationship information of the superimposed images, the header information is read to be utilized in following steps S3 and S4.

Then, the inter-superimposed-image deformation acquisition unit 104 specifies a partial image region of the multiple image (step S2). Here, a partial image may have an arbitrary size of a region smaller than the multiple image. Here, a region of 10×10 [pixels] is adopted.

Further, the inter-superimposed-image deformation acquisition unit 104 acquires a deformation amount (deformation information) of the superimposed image in the partial image region (step S3). As this deformation information, when the header information read in step S1 includes the description of such information, this description is utilized. When there is no description, the entire multiple image and the partial image region are used to calculate an auto-correlation function, thereby obtaining a deformation amount thereof. Here, when calibration is carried out in advance and a direction of deformation of the superimposed images is already known, the deformation amount is obtained by calculation/search of the auto-correlation function along this direction. When the direction is unknown, the deformation amount is obtained by calculation/search of the auto-correlation function based on two-dimensional space.

Then, the signal intensity relationship acquisition unit 106 acquires signal intensity relationship information of superimposed images in the partial image region (step S4). As this signal intensity relationship information, when the header information read in step S1 includes the description of such information, this description is utilized. When the information is already known because of optical calibration performed in advance, a value of this information is utilized.

Then, the control unit 111 initializes a parameter n when performing a plurality of types of image deformation processing to zero (step S5).

Furthermore, the image deformation unit 105 carries out deformation processing for the partial image (step S6). The deformation amount is $\{A(L)\}^n$, and L is the deformation information between superimposed images acquired in step S3.

Subsequently, the control unit 111 judges whether n>K is achieved (step S7). When n>K is not achieved, n=n+1 is determined (step S8), and the control returns to step S6.

On the other hand, when n>K is achieved, a plurality of deformed partial images generated by the plurality of types of deformation processing are added (step S9). At this time, the signal intensity information of the superimposed images obtained in step S4 is taken into consideration. The actual addition processing is the same as Expression (12) (a difference lies in that y is a partial image).

Moreover, the inter-superimposed-image deformation acquisition unit 104 judges whether processing for the entire region has been completed (step S10). Here, when processing for the entire region has not been completed, the region of the partial image is changed (step S11), and the control returns to step S2.

Additionally, when processing for the entire region has been completed, the signal processing unit 107 executes integration processing for all partial images subjected to restoration processing (step S12). As the actual integration processing, for example, the following processing may be adopted. That is, all partial images subjected to restoration processing are added and attached to each other in the same image space as the original multiple image, and then the attached image is divided by a value that is the number of times of performing attachment in a pixel unit, thereby effecting averaging processing. For example, when each partial image of 10×10 [pixels] is acquired and restored while moving every one [pixel] and results obtained from this acquisition and restoration are again added and attached to each other in the same image space as the original multiple image, a value obtained from division by 100 for each pixel is determined as a pixel value of a final restored image.

Further, the signal processing unit 107 outputs a signal of a restoration result of the multiple image subjected to integration processing in step S12 to be recorded in the recording unit 103 as a final output.

As explained above, according to the first embodiment, the deformation information between superimposed images included in the multiple image is acquired, and the multiple image is deformed at least twice to be geometrically deformed based on the deformation information between superimposed image, thereby generating at least two deformed images. Furthermore, the signal intensity relationship information indicative of a relationship between signal intensities of the superimposed images included in the multiple image is acquired, and this signal intensity relationship information is used to add the at least two deformed images generated by the deformation processing. Then, the restored image in which images of the subject do not overlap each other can be obtained.

That is, according to the first embodiment, the multiple image is geometrically deformed and the plurality of deformed images generated by this deformation are added, thereby generating the restored image in which images of the subject are not superimposed on each other from the multiple image in which images of the subject are superimposed on each other.

Therefore, when a multiple image is acquired and distance measurement is carried out in such an image acquisition apparatus as disclosed in, e.g., Jpn. Pat. Appln. KOKAI Publication No. 2006-329897 and Jpn. Pat. Appln. KOKAI Publication No. 7-135597, restoring the multiple image to its original state enables generating an excellent image for appreciation.

According to the first embodiment, for example, a reference signal such as a GCR signal does not have to be prepared at the time of canceling ghosting which is one type of multiple image, and performing simple deformation processing enables excellent ghost cancellation. Moreover, since a reference signal such as a GCR signal does not have to be prepared, a ghost in a picture resource already acquired as a ghost image can be canceled afterward by performing simple processing. Additionally, according to the first embodiment, a state of superimposed images included in a ghost image is modeled, and the restoration processing reproducing its reversal process, i.e., ghost cancellation based on the deformation processing and addition processing according to the first embodiment is executed, thereby easily and highly accurately canceling ghosting.

Further, for example, in regard to a flare image as one type of multiple image, a state of superimposed images included in the flare image is modeled at the time of flare cancellation, and flare canceling can be performed based on the restoration processing reproducing its reversal process, thus easily and highly accurately canceling flare.

Furthermore, for example, when positioning processing and superimposing processing for a plurality of images are performed and a multiple image is provided after superimposition, a state of superimposed images can be modeled, and the superimposed images can be restored to an original state based on the restoration processing reproducing its reversal process. That is, image correction providing a higher image quality than that in the conventional example can be performed without effecting, e.g., correction based on blurring.

Second Embodiment

Figure 6:
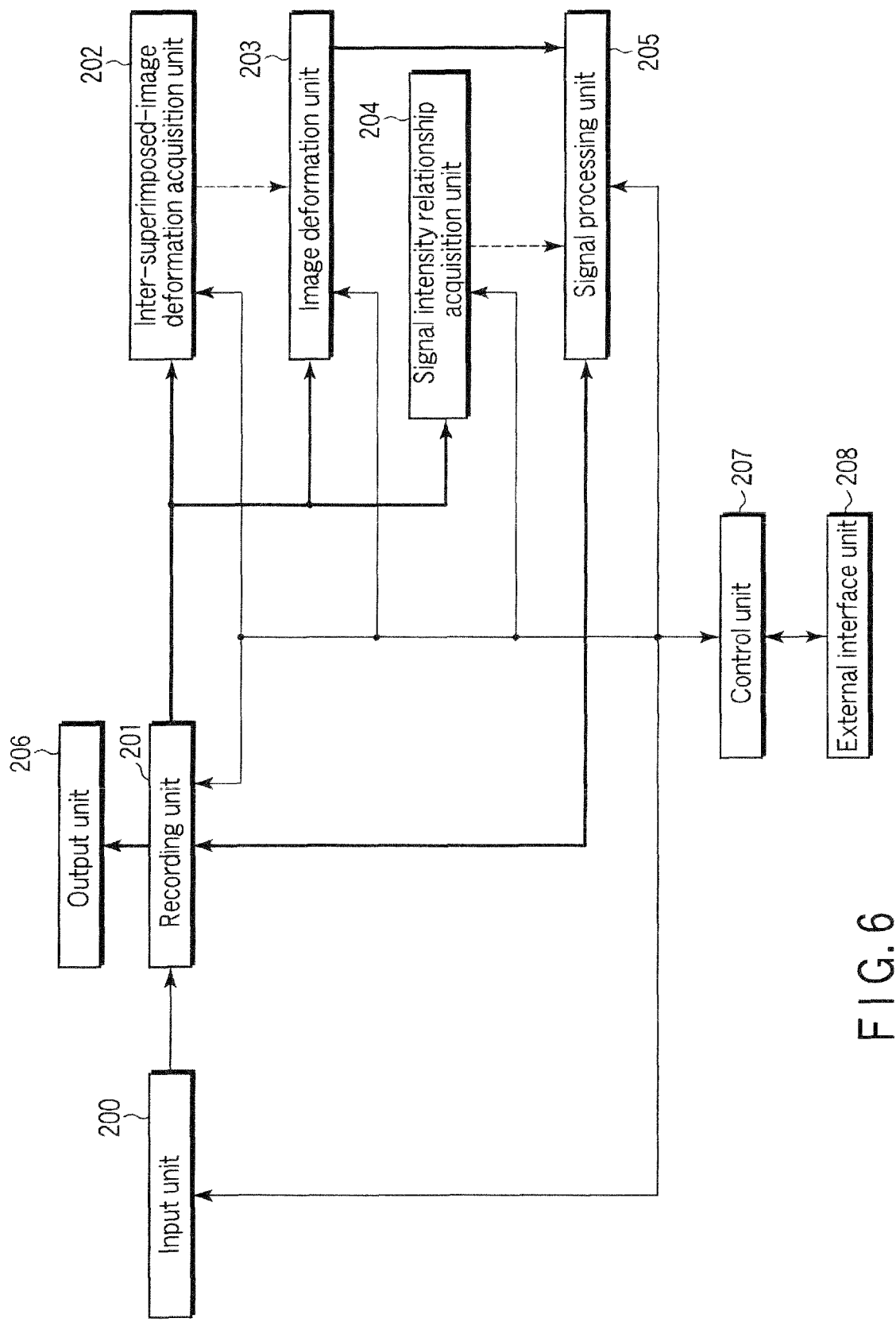
FIG. 6 is a view showing a structure of an image processor according to a second embodiment of the present invention.

As shown in FIG. 6, an image processor according to a second embodiment of the present invention includes an input unit 200, a recording unit 201, an inter-superimposed-image deformation acquisition unit 202, an image deformation unit 203, a signal intensity relationship acquisition unit 204, a signal processing unit 205, an output unit 206, a control unit 207, and an external interface unit 208. It should be noted that an arrow of a solid thick line indicates a flow of a picture signal, an arrow of a solid thin line indicates a flow of a control signal, and an arrow of a broken line indicates a flow of any other signal in FIG. 6, respectively.

The input unit 200 performs image input processing. The recording unit 201 is the same as the recording unit 103 in the first embodiment. The inter-superimposed-image deformation acquisition unit 202 is the same as the inter-superimposed-image deformation acquisition unit 104 in the first embodiment. The image deformation unit 203 is the same as the image deformation unit 105 in the first embodiment. The signal intensity relationship acquisition unit 204 is the same as the signal intensity relationship acquisition unit 106 in the first embodiment. The signal processing unit 205 is the same as the signal processing unit 107 in the first embodiment. The output unit 206 is the same as the output unit 110 in the first embodiment. The control unit 207 is the same as the control unit 111 in the first embodiment. The external interface unit 208 is the same as the external interface unit 112 in the first embodiment.

Operations of the respective units in such a structure will be explained hereinafter in detail.

A multiple image input by the input unit 200 is recorded in the recording unit 201. As the image input by the input unit 200, an arbitrary image can be input, and it is not restricted to the multiple image. When the input image is not a multiple image, it is recorded in the recording unit 201, and then it can be output from the output unit 206. In case of a multiple image, restoration processing for the multiple image is executed through the inter-superimposed-image deformation acquisition unit 202, the image deformation unit 203, the signal intensity relationship acquisition unit 204, and the signal processing unit 205.

Here, the multiple image represents general images in which images of a subject are superimposed on each other. Specifically, it represents: an image acquired when the image acquisition apparatus forms images of a subject in a superimposed manner; a ghost image in which images of a subject are superimposed because of an electronic or an optical function; a flare image; an image in which images of a subject are multiply-layered because of a failure in positioning processing when a plurality of images are positioned and superimposed on each other; and others.

A fundamental scheme of restoration processing for a multiple image is as explained above in the first embodiment.

Image restoration processing according to the structure depicted in FIG. 6 will be explained hereinafter.

A multiple image recorded in the recording unit 201 is transmitted to the inter-superimposed-image deformation acquisition unit 202, and the inter-superimposed-image deformation acquisition unit 202 acquires a displacement amount of superimposed images (deformation information between superimposed images). In this acquisition, when header information of the multiple image includes a description of inter-superimposed-image displacement information or signal intensity relationship information indicative of a relationship between signal intensities of superimposed signals, such information is utilized. On the other hand, when a deformation amount of the superimposed images is unknown, the inter-superimposed-image deformation acquisition unit 202 estimates a displacement amount of the superimposed images. The displacement amount of the superimposed images is estimated based on, e.g., calculation of an auto-correlation function value of the multiple image. An example of a calculating formula of the auto-correlation function is as represented by Expression (10).

Furthermore, an example of the auto-correlation function is as shown in FIG. 2. After calculating an auto-correlation function value, detecting a second peak representing a correlation value of the superimposed images enables performing calculation of deformation information between superimposed images.

It should be noted that the auto-correlation function is calculated in a one-dimensional space here. For example, when a direction of displacement of the superimposed images in the multiple image is already known, displacement of the superimposed images can be searched based on one-dimensional search along the direction of displacement of the superimposed images in this manner. Such information can be written in, e.g., the header information of the multiple image recorded in the recording unit 201, and this information can be read to be known. Furthermore, when a direction of displacement of the superimposed images in the multiple image is unknown, it is good enough to search an auto-correlation function value in two-dimensional space to detect a second peak.

The deformation information between images acquired by the inter-superimposed-image deformation acquisition unit 202 is transmitted to the image deformation unit 203.

The image deformation unit 203 uses the multiple image recorded in the recording unit 201 and the deformation information between superimposed images acquired by the inter-superimposed-image deformation acquisition unit 203 to execute deformation processing with respect to the multiple image.

As this deformation processing, a plurality of types of deformation $\{A(L)\}^n$ (where n=0, 1, ..., K) are executed as represented by Expression (4). Here, L is the deformation information acquired by the inter-super imposed-image deformation acquisition unit 202.

Here, deformation when n=0 is as represented by Expression (11), and this is deformation having no displacement amount.

For example, if the deformation information L is L=(2, 3) [pixel] with a deformation amount representing translational displacement, $\{A(L)\}^n$ (where n=0, 1, ..., K) is translational displacement deformation of (0, 0) (deformation is not actually effected) when n=0, it is translational displacement deformation of (2, 3) when n=1, it is translational displacement deformation of (4, 6) when n=2, and it is translational displacement deformation of (2K, 3K) when n=K.

Although translational displacement processing is taken as an example of simple deformation processing here, actual deformation processing is not restricted to the translational displacement processing. For example, there is executed deformation processing having a higher degree of freedom than that of, e.g., translational displacement processing+scaling processing, affine deformation processing, or projection deformation processing. In such a case, the same scheme can be used to execute the deformation processing.

A plurality of deformed images generated by the image deformation processing in the image deformation unit 203 are then transmitted to the signal processing unit 205 where actual restoration processing is carried out. Furthermore, a relationship between signal intensities of the superimposed images obtained by the signal intensity relationship acquisition unit 204 is transmitted to this signal processing unit 205.

Incidentally, it is preferable for the relationship between signal intensities obtained by the signal intensity relationship acquisition unit 204 to be included as the header information of the multiple image in advance. However, an intensity relationship may be measured every time the multiple image is input, or a user may specify an intensity relationship through the external interface unit 208.

The signal processing unit 205 uses the transmitted relationship between the signal intensities obtained by the signal intensity relationship acquisition unit 204 and the plurality of deformed images generated by the image deformation unit 203 to execute restoration processing for the images based on Expression (12).

As explained above, signal intensity information $\alpha$ of Expression (12) represents a relationship between signal intensities as $0 \leq \alpha < 1$, $\alpha=1$ is achieved when signal intensities of the superimposed images are equal to each other, but $0 < \alpha < 1$ is preferable in actual system design. Moreover, $(\{A(L)\}^n y)$ represents a plurality of deformed images subjected to a plurality of types of deformation processing, and a restored image z can be generated by adding $(\{A(L)\}^n y)$ to each other while considering $(-\alpha)^n$ and multiplying an addition result by $(1+\alpha)$.

The restored image of the multiple image is generated in this manner. The generated restored image is transferred to/recorded in the recording unit 201, and it can be utilized as a resource for appreciation through the output unit 206.

It should be noted that, in the second embodiment, not only the displacement of the superimposed images is carried out as the single displacement, the multiple image may be divided into partial images for respective parts and the above-explained technique may be effected with respect to the partial images. When the multiple image is divided into a plurality of partial images to be subjected to the restoration processing, the restoration processing can be excellently carried out even if the superimposed images have complicated motions. In this case, processing of finally integrating restoration results obtained by effecting the restoring processing with respect to the partial images is additionally executed. The signal processing unit 205 may include this integration processing.

Figure 5:
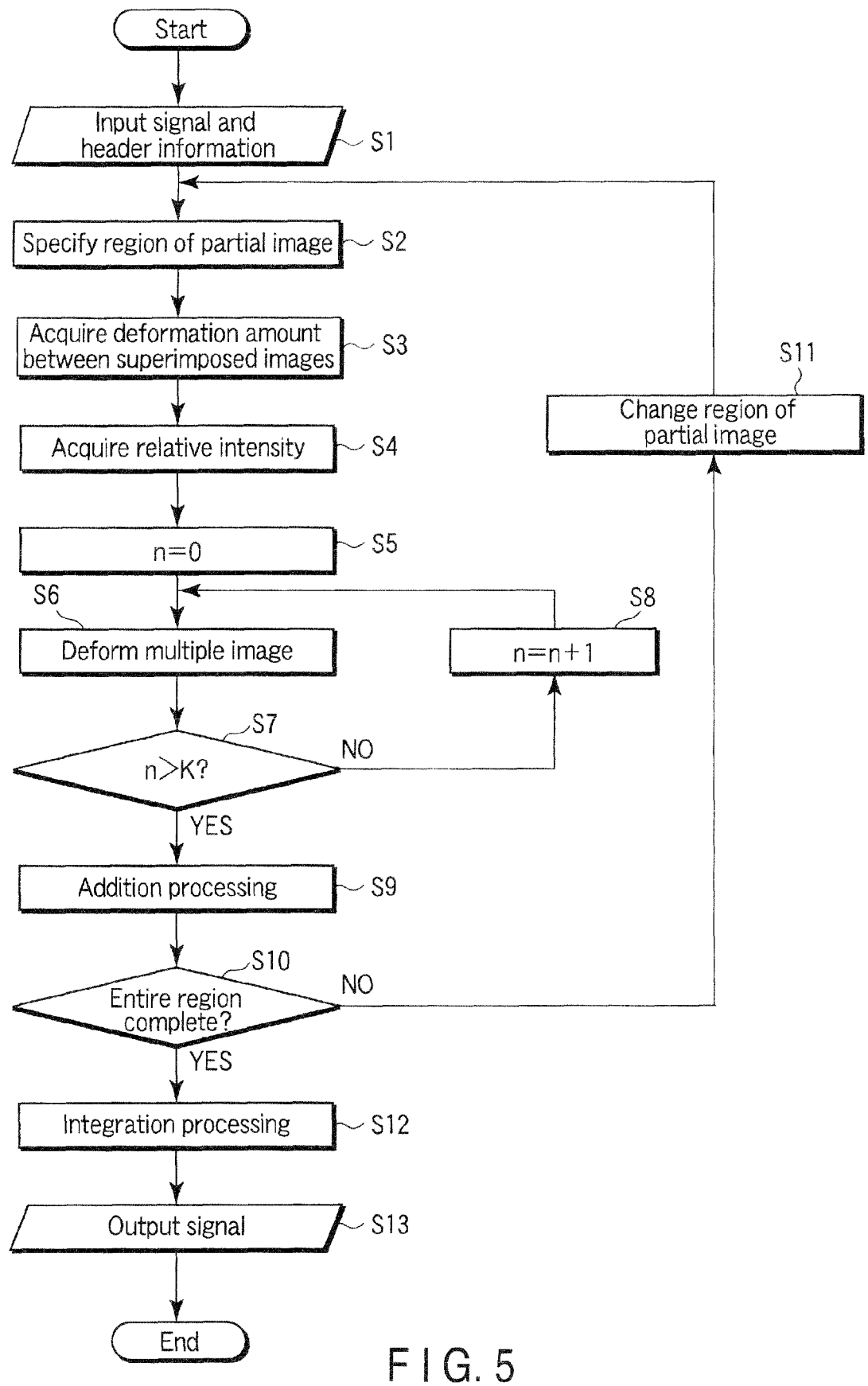
FIG. 5 is a view showing a flowchart for explaining a method of performing restoration processing in a state where a multiple image is divided into partial images in a first embodiment.

The method of performing the restoration processing with the multiple image being divided into the partial images is the same as that explained in conjunction with the flowchart in FIG. 5 in the first embodiment, thereby omitting an explanation thereof.

As explained above, when the image processor is not incorporated in the image acquisition apparatus like the first embodiment but it is configured as a single element, a restored image can be obtained from an externally input multiple image, e.g., a multiple image acquired by the image acquisition apparatus having no image processor.

Although the present invention has been explained based on the first and second embodiments, the present invention is not restricted to the foregoing embodiments, and various deformations or applications can be of course carried out without departing from the scope of the present invention.

For example, a program of software that realizes functions of the foregoing embodiments can be loaded into a computer, and this computer can execute this program software to realize the functions.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processor comprising:
   an image input unit configured to input a multiple image in which images of a subject are superimposed on each other;
   an inter-superimposed-image deformation acquisition unit configured to acquire deformation information between superimposed images included in the multiple image input through the image input unit;
   an image deformation unit configured to generate at least two deformed images by performing deformation processing with respect to the multiple image input through the image input unit at least twice to be geometrically deformed based on the deformation information between superimposed images acquired by the inter-superimposed-image deformation acquisition unit;
   a signal intensity relationship acquisition unit configured to acquire signal intensity relationship information indicative of a relationship between signal intensities of the superimposed images included in the multiple image input through the image input unit; and
   a signal processing unit configured to perform addition processing of the at least two deformed images generated by the deformation processing by using the signal intensity relationship information acquired by the signal intensity relationship acquisition unit.

2. The image processor according to claim 1, wherein the image deformation unit performs translational displacement processing for an image as the deformation processing.

3. The image processor according to claim 1, wherein the image deformation unit performs deformation combining scaling processing with translational displacement processing for an image as the deformation processing.

4. The image processor according to claim 1, wherein the inter-superimposed-image deformation acquisition unit acquires the deformation information between superimposed images by utilizing a previously obtained displacement direction of displacement between the superimposed images on the multiple image.

5. The image processor according to claim 4, wherein the image deformation unit performs deformation processing along the previously obtained displacement direction of displacement between the superimposed images with respect to the multiple image.

6. The image processor according to claim 1, wherein the inter-superimposed-image deformation acquisition unit, the image deformation unit, the signal intensity relationship acquisition unit, and the signal processing unit execute processing in accordance with each partial region as a part of the multiple image, respectively.

7. The image processor according to claim 1, wherein the inter-superimposed-image deformation acquisition unit, the image deformation unit, the signal intensity relationship acquisition unit, and the signal processing unit execute processing in accordance with each partial region as a part of the multiple image respectively, and integrating results of processing carried out in accordance with each partial region enables generating a restored image of the multiple image.

8. An image acquisition apparatus comprising:
   an image acquisition optical system configured to form an image of luminous flux of a subject;
   a multiple image formation unit configured to form images of the subject in a superimposed manner in the image acquisition optical system;
   an image signal generation unit configured to convert light from the image acquisition optical system into an electrical signal and generate an image signal from the converted electrical signal;
   an inter-superimposed-image deformation acquisition unit configured to acquire deformation information between superimposed images included in a multiple image having at least two images generated by the image acquisition optical system, the multiple image formation unit, and the image signal generation unit in a superimposed manner;
   an image deformation unit configured to generate at least two deformed images by performing deformation processing with respect to the multiple image at least twice to be geometrically deformed based on the deformation information between superimposed images acquired by the inter-superimposed-image deformation acquisition unit;
   a signal intensity relationship acquisition unit configured to acquire signal intensity relationship information indicative of a relationship between signal intensities of the superimposed signals included in the multiple image; and
   a signal processing unit configured to perform addition processing of the at least two deformed images generated by the deformation processing by using the signal intensity relationship information acquired by the signal intensity relationship acquisition unit.

9. The image acquisition apparatus according to claim 8, wherein the image deformation unit performs translational displacement processing for an image as the deformation processing.

10. The image acquisition apparatus according to claim 8, wherein the image deformation unit performs deformation combining scaling processing with translational displacement processing for an image as the deformation processing.

11. The image acquisition apparatus according to claim 8, wherein the inter-superimposed-image deformation acquisition unit acquires the deformation information between superimposed images by utilizing a previously obtained displacement direction of displacement between the superimposed images on the multiple image.

12. The image acquisition apparatus according to claim 11, wherein the image deformation unit performs deformation processing along the previously obtained displacement direction of displacement between the superimposed images with respect to the multiple image.

13. The image acquisition apparatus according to claim 8, wherein the inter-superimposed-image deformation acquisition unit, the image deformation unit, the signal intensity relationship acquisition unit, and the signal processing unit execute processing in accordance with each partial region as a part of the multiple image, respectively.

14. The image acquisition apparatus according to claim 8, wherein the inter-superimposed-image deformation acquisition unit, the image deformation unit, the signal intensity relationship acquisition unit, and the signal processing unit execute processing in accordance with each partial region as a part of the multiple image respectively, and integrating results of processing carried out in accordance with each partial region enables generating a restored image of the entire image.

15. A non-transitory storage medium storing an image processing program allowing a computer to execute the following steps:
    performing input processing of a multiple image in which images of a subject are superimposed on each other;
    acquiring deformation information between superimposed images included in the input multiple image;
    generating at least two deformed images by performing deformation processing with respect to the input multiple image at least twice to be geometrically deformed based on the acquired deformation information between superimposed images;
    acquiring signal intensity relationship information indicative of a relationship between signal intensities of the superimposed images included in the input multiple image; and
    performing addition processing of the at least two deformed images generated from the deformation processing by using the acquired signal intensity relationship information.

16. An image processing method comprising:
    performing input processing of a multiple image in which images of a subject are superimposed on each other;
    acquiring deformation information between superimposed images included in the input multiple image;
    generating at least two deformed images by performing deformation processing with respect to the input multiple image at least twice to be geometrically deformed based on the acquired deformation information between superimposed images;
    acquiring signal intensity relationship information indicative of a relationship between signal intensities of the superimposed images included in the input multiple image; and
    generating a restored image in which images of the subject are not superimposed on each other by adding the at least two deformed images generated from the deformation processing based on the acquired signal intensity relationship information.

* * * * *